United States Patent [19]

Dietz

[11] 4,398,788
[45] Aug. 16, 1983

[54] BINOCULAR VIEWING DEVICE

[75] Inventor: Wolfgang Dietz, Lilienthal, Fed. Rep. of Germany

[73] Assignee: U.S. Philips Corporation, New York, N.Y.

[21] Appl. No.: 212,478

[22] Filed: Dec. 3, 1980

[30] Foreign Application Priority Data

Dec. 4, 1979 [DE] Fed. Rep. of Germany ....... 2948687

[51] Int. Cl.$^3$ ...................... G02B 23/02; G02B 23/12
[52] U.S. Cl. .................................................. 350/550
[58] Field of Search ...................... 350/35, 54, 75, 78; 5/451

[56] References Cited

U.S. PATENT DOCUMENTS 2,735,337  2/1956  Frischmann ...................... 350/75 X
3,454,223  7/1969  Bulthuis et al. .................. 350/35 X
3,737,667  6/1973  Babb et al. ....................... 350/35 X

FOREIGN PATENT DOCUMENTS 749352  1/1944  Fed. Rep. of Germany ........ 350/35

Primary Examiner—John K. Corbin
Assistant Examiner—Matthew W. Koren
Attorney, Agent, or Firm—Marc D. Schechter

[57] ABSTRACT

In a binocular viewing device for observing one image with both eyes simultaneously, the image is observed directly via a beam splitter with a first ocular, and the image is observed indirectly with a second ocular via an optical imaging system which forms an intermediate image to which the second ocular is adjusted. The optical imaging system may comprise a collimator objective, a telescope objective and an image-inverting deflecting prism.

7 Claims, 1 Drawing Figure

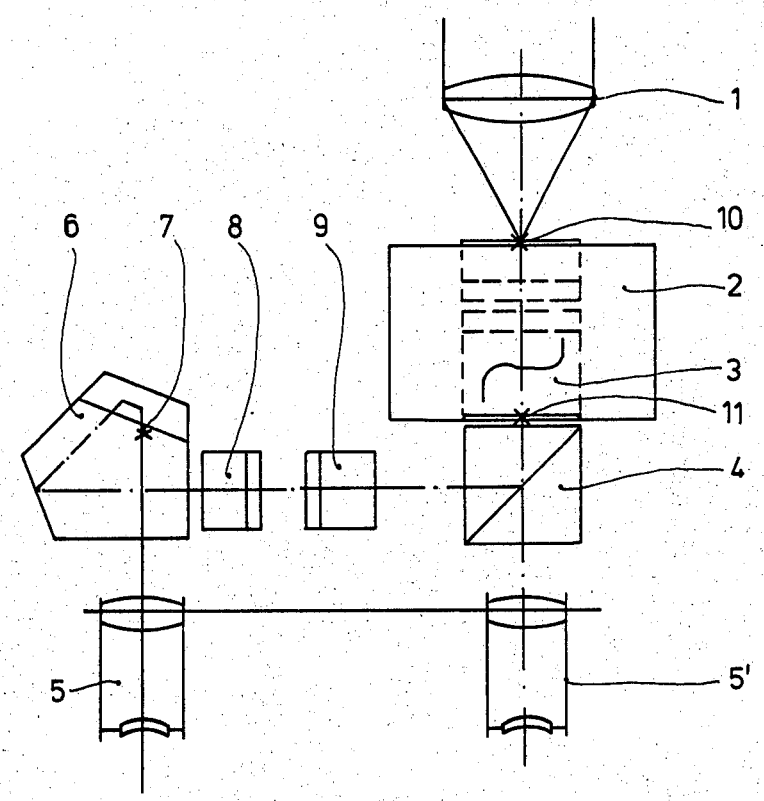

BINOCULAR VIEWING DEVICE

BACKGROUND OF THE INVENTION

The invention relates to a binocular viewing device for viewing an image with both eyes simultaneously. The device includes a first and a second ocular, a beam splitter and a deflecting prism.

Such viewing devices are used to form separate images for each eye, in one image plane, such as for example in connection with the use of a microscope. Known viewing devices employ a plurality of rhomboid deflecting prisms and a beam splitter. One ocular is adjusted to the image plane via one deflecting prism and the beam splitter, and the other ocular via two deflecting prisms and the beam splitter. Adjusting the viewing device to the observer's pupillary distance is then effected by rotation via a periscopic transmission. However, this construction leads to a bulky and heavy viewing device which is not flat. Due to the size of the deflecting prisms, the device is made of two parts which are arranged at an angle relative to each other, and the parts should be rotatable relative to each other so to enable adjustment to the observer's pupillary distance.

SUMMARY OF THE INVENTION

It is an object of the invention to provide a viewing device, of the type described above, which is simple, small, of a flat construction and simply adjustable to the observer's pupillary distance. According to the invention the viewing device includes a first ocular which is adjusted to the image via the beam splitter only. Between the beam splitter and the second ocular there is arranged an optical imaging system for forming an intermediate image in an intermediate image plane, to which the second ocular is adjusted. This viewing device is of an asymmetrical construction, allowing a number of deflecting prisms to be dispensed with. In this way a compact and flat construction is possible.

In a preferred embodiment of the device according to the invention the optical imaging system comprises a collimator objective, whose object focal plane (via the beam splitter) substantially coincides with the image to be observed, a telescope objective arranged in front of the collimator objective and having substantially the same focal length as the collimator objective, and an image inverting prism. The second ocular is adjusted to the focal plane of the telescope objective, which focal plane forms the intermediate image plane. Such objectives can be of very simple and compact construction, so that the complete viewing device can be very small.

According to a further aspect of the device according to the invention, the telescope objective, the prism and the second ocular constitute a single structural unit which can be shifted relative to the collimator objective for adjusting the oculars to the observer's pupillary distance. Such a construction provides a very convenient adjustment facility, because the path of the beam between the collimator objective and the telescope objective is substantially parallel.

In order to minimize the influence of a slight tilting of the pupillary distance-adjusting unit relative to the beam splitter the first ocular and the collimator objective during adjustment, the telescope objective may have the same focal length as the second ocular. Thus, the parallelism of the viewing device for both eyes is maintained even in the case of a slight tilt.

The viewing device according to the invention can be used advantageously in a viewing apparatus which further comprises an objective and an image intensifier. Suitably, an image twister comprising a bundle of glass fibers is arranged between the image intensifier and the binocular viewing device. When observing terrestrial scenes by means of the viewing device, it is necessary that the image to be viewed is erect in the image plane. For other uses, such as microscopes, where the image orientation is irrelevant, the image to be observed may remain inverted.

BRIEF DESCRIPTION OF THE DRAWING

The sole drawing FIGURE is a schematic diagram of an embodiment of a device according to the invention.

DESCRIPTION OF THE PREFERRED EMBODIMENTS

An objective 1 forms an inverted image, of a scene to be observed, on the cathode 10 of an image intensifier tube 2. An image twister 3, for example comprising a bundle of glass fibers, in the image intensifier tube 2 ensures that the image formed in the image plane 11 is not inverted.

The image in the image plane 11 is viewed directly with the right-hand ocular 5', that is it is viewed only via the beam splitter 4. This beam splitter transmits approximately 50% of the light emitted by the image plane and reflects the remainder of the light. As the partly reflecting surface of the beam splitter 4 makes an angle of 45° with the axes of the image intensifier tube and of the ocular 5' (which axes substantially coincide with each other) the direction of the reflected light is perpendicular to the axis of the ocular 5'.

The reflected light beam is received by a collimator objective 9. This objective constitutes one structural unit with the image intensifier tube 2, the twister 3, the beam splitter 4, and the ocular 5'.

When the collimator objective 9 is adjusted so that its focal plane coincides with the image plane 11, the beam will leave the collimator objective 9 as a substantially parallel beam.

This beam enters the telescope objective 8, which effectively has the same focal length as the collimator objective 9, in order to obtain a unity imaging scale. The objectives 8 and 9 may be of identical construction.

The beam emerging from the telescope objective 8 is incident on a pentagonal-roof prism 8 (a so-called Goulier prism) and is deviated through 90°. Due to the double reflection inside this prism the image is simultaneously inverted. The intermediate image plane 7 may be situated in the prism 6.

The beam which exits from the prism 6 is incident on the ocular 5, which is adjusted to the intermediate image plane 7 and which corresponds to the ocular 5'. The intermediate image plane 7 should therefore be disposed in the same plane as the image plane 11. Image plane 7 may be slightly tilted with respect to image plane 11 because the telescope objective 8, the prism 6 and the ocular 5 form one structural unit, which is arranged to be slidable relative to the structural unit comprising the elements 2, 3, 4, 5' and 9.

Since the light beam between the collimator objective 9 and the telescope objective 8 is substantially parallel, the intermediate image plane 7 is not shifted when the two units are moved relative to each other in order to adjust the two oculars 5 and 5' to the observer's pupillary distance. Since the collimator objective 9 and the telescope objective 8 have the same focal length, the same image with the same size as in the image plane 11 is formed in the intermediate image plane 7. As a result of this, the image viewed via the two oculars 5 and 5' is always the same, independent of the shift of the two units relative to each other.

Thus, a night-viewing device is obtained with which one can observe a scene, whose intensity has been increased by an intensifier tube, with both eyes, although the expensive image-intensifier tube need only be provided once. (The stereoscopic impression which would be obtained by using two image intensifier tubes would be negligible).

In order to obtain a compact, flat and light construction, a pentaprism is selected for the element 6. As a result of this, it is not possible to arrange a field lens in the intermediate image plane 7. For small diameter oculars 5, it is not possible to observe the entire intermediate image at the left side, but only a central portion thereof. If the observer adds the central portion of the left-hand image to the complete right-hand image, then, according to the Schrödinger equation for binocular intensity interaction, a uniform overall image impression $B_G$ is obtained, which is given by $$B_G = (B_H^2 + B_D^2)/(B_H + B_D)$$

where $B_H$ is the brightness of the light image areas and $B_D$ the brightness of the corresponding dark picture areas.

This effect also leads to a reduction of vignetting in the case of large pupillary-distance settings, when the distance between the collimator objective and the telescope objective is increased and the telescope objective need not be arranged obliquely for this.

What is claimed is:

1. A binocular viewing device, for viewing a single image simultaneously with both eyes, comprising:
   a beam splitter, arranged in front of the image, for splitting the image into a first beam and a second beam;
   a first ocular, arranged in front of the beam splitter for intercepting the first beam, said ocular being adjusted for viewing the image directly through the beam splitter;
   an optical imaging system, arranged in front of the beam splitter for intercepting the second beam, said imaging system forming an intermediate image in an image plane; and
   a second ocular, arranged in front of the optical imaging system, said ocular being adjusted to view the image at the intermediate image plane.

2. A binocular viewing device, as claimed in claim 1, CHARACTERIZED IN THAT the optical imaging system comprises:
   a collimator objective having an object focal plane which corresponds substantially with the image;
   a telescope objective arranged in front of the collimator objective and having a focal length which is substantially the same as that of the collimator objective, said telescope objective having an image focal plane corresponding to the intermediate image plane; and
   an image inverting prism, arranged in front of the telescope objective.

3. A binocular viewing device as claimed in claim 2 CHARACTERIZED IN THAT the telescope objective, the prism, and the second ocular comprise a single structural unit which can be displaced with respect to the collimator objective in order to adjust for the pupillary distance between the eyes of an observer.

4. A binocular viewing device as claimed in claim 3, CHARACTERIZED IN THAT the second ocular has a focal length equal to the focal length of the telescope objective.

5. A binocular viewing device, for viewing a single image simultaneously with both eyes, comprising a beam splitter, first and second oculars, and a deflection prism, CHARACTERIZED IN THAT:
   the first ocular is adjusted for viewing the image directly through the beam splitter;
   the device further comprises an optical imaging system for forming an intermediate image at an intermediate image plane, said optical imaging system comprising (i) a collimator objective having an object focal plane which corresponds substantially with the image, (ii) a telescope objective arranged in front of the collimator objective and having a focal length which is substantially the same as that of the collimator objective, said telescope objective having an image focal plane corresponding to the intermediate image plane, and (iii) the deflection prism, said deflection prism comprising an image inverting prism arranged in front of the telescope objective; and
   the second ocular is adjusted for viewing, via the optical imaging system, the image at the intermediate image plane.

6. A binocular viewing device, as claimed in claim 5, CHARACTERIZED IN THAT the telescope objective, the image inverting prism, and the second ocular comprise a single structural unit which can be displaced with respect to the collimator objective in order to adjust for the pupillary distance between the eyes of an observer.

7. A binocular viewing device as claimed in claim 6, CHARACTERIZED IN THAT the second ocular has a focal length equal to the focal length of the telescope objective.

* * * * *